United States Patent
Bartley et al.

(10) Patent No.: US 10,055,380 B2
(45) Date of Patent: *Aug. 21, 2018

(54) DYNAMIC CLOCK LANE ASSIGNMENT FOR INCREASED PERFORMANCE AND SECURITY

(71) Applicant: International Business Machines Corporation, Armonk, NY (US)

(72) Inventors: Gerald K. Bartley, Rochester, MN (US); Darryl J. Becker, Rochester, MN (US); Matthew S. Doyle, Chatfield, MN (US); Mark J. Jeanson, Rochester, MN (US); Mark O. Maxson, Mantorville, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/862,801

(22) Filed: Jan. 5, 2018

(65) Prior Publication Data

US 2018/0129626 A1    May 10, 2018

Related U.S. Application Data

(63) Continuation of application No. 14/968,166, filed on Dec. 14, 2015.

(51) Int. Cl.
*G06F 13/00* (2006.01)
*G06F 13/42* (2006.01)
(Continued)

(52) U.S. Cl.
CPC ...... *G06F 13/4291* (2013.01); *G06F 13/4068* (2013.01); *G06F 13/4282* (2013.01); *G06F 11/1428* (2013.01)

(58) Field of Classification Search
CPC ............ G06F 13/4291; G06F 13/4068; G06F 11/1428
See application file for complete search history.

(56) References Cited

U.S. PATENT DOCUMENTS 7,461,287 B2   12/2008   Dreps et al.
8,321,717 B2   11/2012   Harrison et al.
(Continued)

OTHER PUBLICATIONS

Anonymously; "A System and Method for Predicting Scalability of Parallel Applications in Presence of Operating System (OS) Jitter using Trace Driven Simulation"; An IP.com Prior Art Database Technical Disclosure; http://ip.com/IPCOM/000200892; Oct. 29, 2010.

(Continued)

*Primary Examiner* — Zachary K Huson
(74) *Attorney, Agent, or Firm* — ZIP Group PLLC

(57) ABSTRACT

A lane within a processor bus that communicatively connects a transmitter and a receiver is dynamically assigned as a clock lane. The clock lane subsequently transmits a reference clock signal to coordinate data communications from the transmitter to the receiver. The clock lane may be assigned by determining signal margins of various lanes of the processor bus. The signal margins are determined by the transmitter sending a test pattern upon the various lanes and analyzing the received test pattern at the receiver. A dynamically assigned clock lane results increased overall signal integrity of communications between the transmitter and receiver. Further, a dynamically assigned clock lane may result in different lanes being assigned as the clock lane at distinct boot up instances, adding to the complexity of the unauthorized user determining the operational logic of the transmitter.

20 Claims, 7 Drawing Sheets

(51) Int. Cl.
*G06F 13/40* (2006.01)
*G06F 11/14* (2006.01)

(56) References Cited

U.S. PATENT DOCUMENTS

| | | | |
|---|---|---|---|
| 8,767,531 | B2 | 7/2014 | Ferraiolo et al. |
| 2011/0285420 | A1 | 11/2011 | Deas et al. |
| 2011/0285421 | A1 | 11/2011 | Deas et al. |
| 2013/0007502 | A1* | 1/2013 | Iyer .................... G06F 11/1423 714/3 |
| 2013/0103927 | A1* | 4/2013 | Berry, Jr. ................ G06F 15/00 712/30 |
| 2015/0091617 | A1 | 4/2015 | Zerbe et al. |
| 2017/0168983 | A1* | 6/2017 | Bartley ............... G06F 13/4291 |

OTHER PUBLICATIONS

Siemens et al.; "A Jitter Reduction and Clock Cycle Restoration Circuit"; An IP.com Prior Art Database Technical Disclosure; http://ip.com/IPCOM/000124400; Apr. 19, 2005.
"List of IBM Patents or Patent Applications Treated as Related," dated herewith.

\* cited by examiner

DYNAMIC CLOCK LANE ASSIGNMENT FOR INCREASED PERFORMANCE AND SECURITY

FIELD OF THE INVENTION

Embodiments of the invention generally relate to computers and more particularly to dynamically assigning a clock lane to increase computer performance and security.

DESCRIPTION OF THE RELATED ART

Computers typically include a printed circuit board (PCB) that mechanically supports and electrically connects electronic components, such as a processor, memory module, hard drive, etc., using conductive wires formed from conductive sheets that are laminated onto a non-conductive substrate.

The conductive wires of the PCB may be formed from the conductive sheets by patterning a protective mask on the conductive layer and removing portions of the conductive layer that are not protected by the pattern. The protective mask is removed and the portions of the conductive layer that remain may form the conductive wires. This fabrication technique may be referred to as a subtractive technique since undesired conductive sheet material is removed to form the conductive wires. Alternatively, the conductive wires may be formed upon the non-conductive substrate by an additive fabrication technique, such as printing a conductive ink upon the non-conductive substrate, etc.

Signal integrity or SI is a set of measures of the quality of an electrical signal. In digital electronics, a stream of binary values is represented by a voltage (or current) waveform. However, digital signals are fundamentally analog in nature, and all signals are subject to effects such as noise, distortion, and loss. Over short distances and at low bit rates, the conductive wire can transmit a signal with sufficient fidelity. At high bit rates or over longer distances, various effects can degrade the signal to the point where errors occur and the computer or electronic component fails.

Because of PCB physical layout constraints, some of the conductive wires that electrically connect a pair of electronic components may not have similar lengths. Further, because of conductive wire fabrication variability, some of the conductive wires that electrically connect the pair of electronic components may not have similar cross sectional area. These variations may result in the SI associated with each conductive wire that electrically connects the pair of electronic components being different. Because at least some of the SI variations are introduced at the time of PCB fabrication, it is difficult to compensate, account for, and/or reduce the SI variations, which may result in the computer operating inefficiently.

In addition, the security of computers is increasing important. Preventing or impeding unauthorized access of the computer is paramount to protecting sensitive data stored within the computer and/or protecting operational details of the computer. Currently, unauthorized users may learn operational details of the computer by viewing the operating computers system PCB with an infrared camera. The camera visualizes electromagnetic radiation of the various components of the PCB. For example, the conductive wires connected to the processor may be viewed to determine the digital pattern of the conductive wires going high and low. The pattern may be recorded to deduce the logic or other operational details of the processor.

SUMMARY

In an embodiment of the present invention, a data handling system is presented. The data handling system includes a transmitter that transmits a signal pattern upon each lane of a multiple lane bus. The data handling system also includes a receiver that receives the signal pattern from each lane of the multiple lane bus. The receiver also determines a distortion associated with the received signal pattern from each lane and identifies a particular lane of the multiple lane bus that is associated with a smallest distortion. The transmitter or the receiver assigns the particular lane associated with smallest distortion as a clock lane that transmits a reference clock signal between the transmitter and the receiver in subsequent signal transmissions between the transmitter and the receiver.

In another embodiment of the present invention, a data handling system is presented. The data handling system includes a transmitting processor that transmits a signal pattern upon each lane of a multiple lane bus. The data handling system also includes a receiving processor that receives the signal pattern from each lane of the multiple lane bus. The receiving processor also determines a distortion associated with the received signal pattern from each lane and identifies a particular lane of the multiple lane bus that is associated with a smallest distortion. The transmitting processor or the receiving processor assigns the particular lane associated with smallest distortion as a clock lane that transmits a reference clock signal between the transmitting processor and the receiving processor in subsequent signal transmissions between the transmitting processor and the receiving processor.

In another embodiment of the present invention, a system that includes a first processor communicatively connected to a second processor by a multiple lane bus is presented. The first processor includes a first computer readable storage medium and the second processor includes a second computer readable storage medium. The first computer readable storage medium and the second computer readable storage medium collectively include program instructions that are readable to cause the first processor to transmit a signal pattern upon each lane of a multiple lane bus. The program instructions are further readable to cause the second processor to receive the signal pattern from each lane of the multiple lane bus, determine a distortion associated with the received signal pattern from each lane, and identify a particular lane of the multiple lane bus that is associated with a smallest distortion. The program instructions are further readable to cause the first processor or the second processor to assign the particular lane associated with smallest distortion as a clock lane that transmits a reference clock signal between the first processor and the second processor in subsequent signal transmissions between the first processor and the second processor.

These and other embodiments, features, aspects, and advantages will become better understood with reference to the following description, appended claims, and accompanying drawings.

It is to be noted, however, that the appended drawings illustrate only example embodiments of the invention, and are therefore not considered a limitation of the scope of embodiments of the invention.

DETAILED DESCRIPTION

Embodiments relate to determining the SI of each lane in a processor bus that communicatively connects a transmitting processor (transmitter) to a receiving processor (receiver). In one embodiment, the transmitter sends signal patterns on each lane of the processor bus that are received by the receiver. The receiver superimposes the received signal patterns to form an eye pattern and distortion is determined by measuring the width of the eye in the eye pattern for each lane. The transmitter assigns the lane associated with the minimum distortion as a clock lane in subsequent data passing operations from the transmitter to the receiver.

In another embodiment, additional lanes exist within the processor than are used in data passing operations. For example, if the processor bus operates as a 32 bit bus, the processor bus includes additional lane(s), e.g. 34 singled ended lanes. The additional lane(s) associated with the maximum distortion are deactivated in subsequent data passing operations, such that no data signals that makeup the processor bus data width are passed upon the deactivated lane(s).

In another embodiment, a first lane is assigned as the clock lane and the transmitter sends signal patterns on each of the other lanes of the processor bus. The signal patterns are delayed by a delay step and received by the receiver and the distortion is determined for each of the other lanes of the processor bus. Signal patterns are again sent and are delayed by an incremented delay step and distortion is determined for each of the other lanes of the processor bus. This process is repeated until a predetermined maximum delay steps have been reached. In turn, a second lane is assigned as the clock lane and the process repeats delaying the patterns by an increased delay step until all the lanes in the processor bus have been assigned as the clock lane. It is determined which lane was assigned as the clock lane that resulted in the minimum distortion at the lowest possible delay step. This lane is then assigned as the clock lane in subsequent data passing operations from the transmitter to the receiver. Similar to above, if the processor bus includes additional lane(s), the lane(s) that are associated with the maximum distortion at the same delay step are deactivated in subsequent data passing operations, such that no data signals that makeup the processor bus data width are passed upon the deactivated lane(s).

Figure 1:
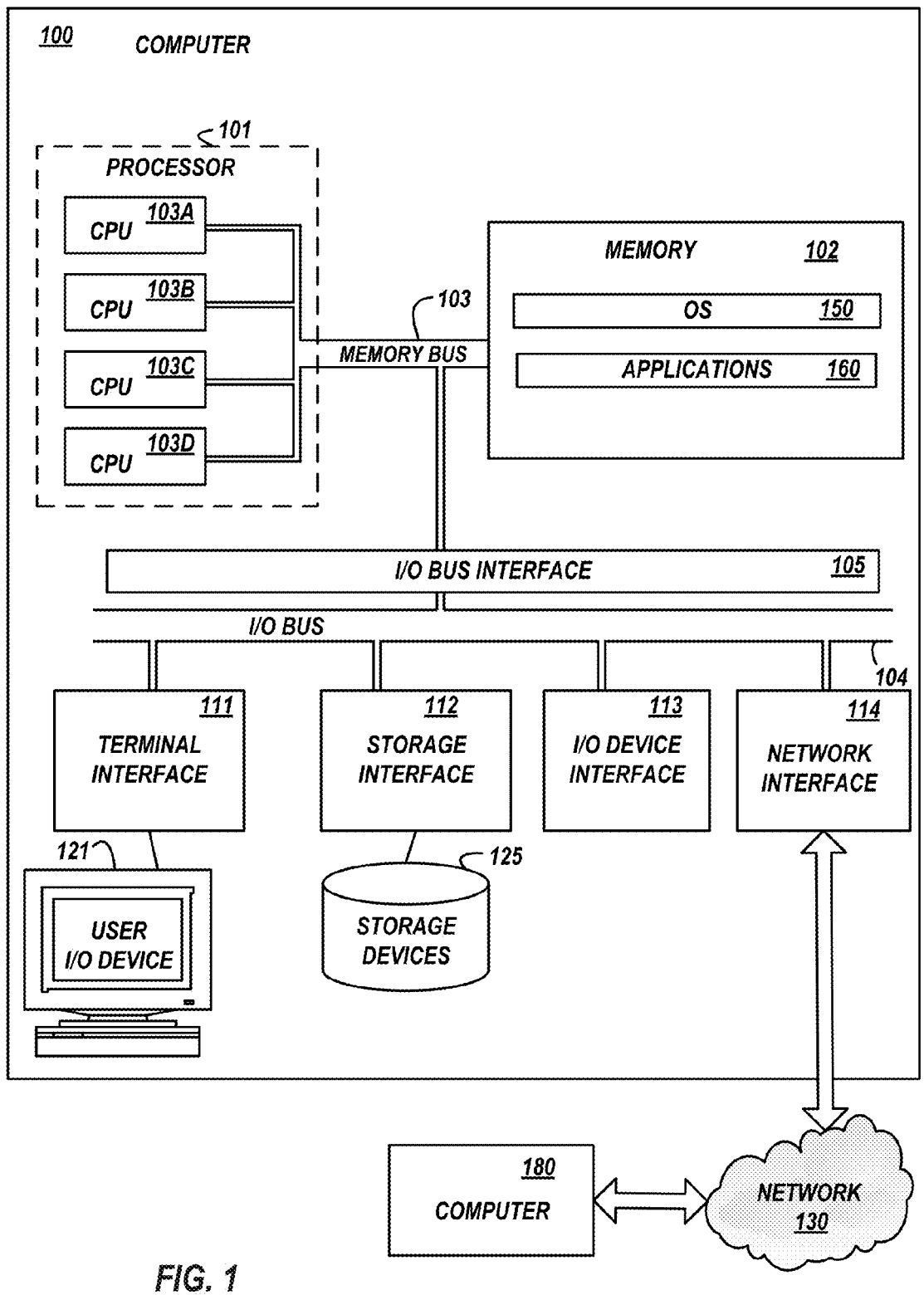
FIG. 1 illustrates a high-level block diagram of an exemplary computer for implementing various embodiments of the invention.

Referring to the Drawings, wherein like numbers denote like parts throughout the several views, FIG. 1 depicts a high-level block diagram representation of a computer 100 connected to another computer 180 via a network 130, according to an embodiment of the present invention. Computer 180 may include the same components as computer 100. The term "computer" is used herein for convenience only, and in various embodiments is a more general data handling system, such as a mobile phone, tablet, server computer, cash machine, etc. The mechanisms and apparatus of embodiments of the present invention apply equally to any appropriate data handling system.

The major components of the computer 100 may comprise one or more processors 101, a system memory 102, a terminal interface 111, a storage interface 112, an I/O (Input/Output) device interface 113, and a network interface 114, all of which are communicatively coupled, directly or indirectly, for inter-component communication via one or more busses, such as memory bus 103, I/O bus 104, an I/O bus interface unit 105, etc. The computer 100 contains one or more general-purpose programmable central processing units (CPUs) 103A, 103B, 103C, and 103D, herein generically referred to as processor 101. In embodiments, the computer 100 contains multiple processors 101 typical of a relatively large system. Each processor 101 executes instructions stored in the system memory 102 and may comprise one or more levels of on-board cache. One of the multiple processors 101 may be a coprocessor. Generally, the coprocessor also executes instructions stored in the system memory 102 and may comprise one or more levels of on-board cache. The coprocessor generally allows the processor 101 to offload the execution of some instructions stored in the system memory 102 allowing the processor 101 to execute other instructions stored in the system memory 102. The coprocessor may also operate upon data that was previously operated upon by the processor 101 or upon data that will be subsequently operated upon by the processor 101. The offloading to the coprocessor generally allows for improved performed of particular instructions stored in the system memory 102. As such, the coprocessor may also be referred to as an accelerator, acceleration unit, or the like.

In an embodiment, the system memory 102 may comprise a random-access semiconductor memory, storage device, or storage medium for storing or encoding data and programs. In another embodiment, the system memory 102 represents the entire virtual memory of the computer 100, and may also include the virtual memory of other computers coupled to the computer 100 or connected via the network 130. The system memory 102 is conceptually a single monolithic entity, but in other embodiments the system memory 102 is a more complex arrangement, such as a hierarchy of caches and other memory devices. For example, memory 102 may exist in multiple levels of caches, and these caches may be further divided by function, so that one cache holds instructions while another holds non-instruction data, which is used by the processor 101. Memory may be further distributed and associated with different processors 101 or sets of processors 101, as is known in any of various so-called non-uniform memory access (NUMA) computer architectures.

The system memory 102 stores or encodes an operating system 150, an application 160, and/or other program instructions. Although the operating system 150, application 160, etc. are illustrated as being contained within the memory 102 in the computer 100, in other embodiments some or all of them may be on a different computer 180 and may be accessed remotely, e.g., via the network 130. The computer 100 may use virtual addressing mechanisms that allow the programs of the computer 100 to behave as if they only have access to a large, single storage entity instead of access to multiple, smaller storage entities. Thus, while operating system 150, application 160, or other program instructions are illustrated as being contained within the system memory 102, these elements are not necessarily all completely contained in the same storage device at the same time. Further, although operating system 150, application 160, other program instructions, etc. are illustrated as being separate entities, in other embodiments some of them, portions of some of them, or all of them may be packaged together, etc.

In an embodiment, operating system 150, application 160, and/or other program instructions comprise instructions or statements that execute on the one or more processors 101 and/or instructions or statements that are interpreted by instructions or statements that execute on the one or more processors 101 to carry out the functions as further described below. When such program instructions are able to be run by the one or more processors 101, such computer 100 becomes a particular machine configured to carry out such instructions.

One or more processors 101 may function as a general-purpose programmable graphics processor unit (GPU) that builds images (e.g. a GUI) for output to a display. The GPU, working in conjunction with one or more applications 160, determines how to manipulate pixels on e.g. display, touch screen, etc. to create a display image or user interface. Ultimately, the image (e.g. GUI, etc.) may be displayed to a user via a user I/O device 121. The processor 101 and GPU may be discrete components or may be integrated into a single component.

The memory bus 103 provides a data communication path for transferring data among the processor 101, the system memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104. The I/O interface units support communication with a variety of storage and I/O devices. For example, the terminal interface unit 111 supports the attachment of one or more user I/O devices 121, which may comprise user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 121 and the computer 100, and may receive output data via the user output devices. For example, the interface may be presented via the user I/O device 121, such as displayed on a display device, played via a speaker, or printed via a printer. The user interface may be a user interface that provides content to a user visually (e.g. via a screen), audibly (e.g. via a speaker), and/or via touch (e.g. vibrations, etc.). In some embodiments, the computer 100 itself acts as the user interface as the user may move the computer 100 in ways to interact with, input, or manipulate computer application 160 data, function, etc.

The storage interface unit 112 supports the attachment of one or more disk drives or secondary storage devices 125. In an embodiment, the secondary storage devices 125 are rotating magnetic disk drive storage devices, but in other embodiments they are arrays of disk drives configured to appear as a single large storage device to a host computer, or any other type of storage device. The contents of the system memory 102, or any portion thereof, may be stored to and retrieved from the secondary storage devices 125, as needed. The secondary storage devices 125 have a slower access time than does the memory 102, meaning that the time needed to read and/or write data from/to the memory 102 is less than the time needed to read and/or write data from/to for the secondary storage devices 125.

The I/O device interface 113 provides an interface to any of various other input/output devices or devices of other types, such as printers or fax machines. The network adapter 114 provides one or more communications paths from the computer 100 to other data handling devices such as numerous other computers (e.g., computer 180); such paths may comprise, e.g., one or more networks 130. Although the memory bus 103 is shown in FIG. 1 as a relatively simple, single bus structure providing a direct communication path among the processors 101, the system memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 105 and the I/O bus 104 are shown as single respective units, the computer 100 may, in fact, contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

I/O interface 113 may contain electronic components and logic to adapt or convert data of one protocol on I/O bus 104 to another protocol on another bus. Therefore, I/O interface 113 may connect a wide variety of devices to computer 100 and to each other such as, but not limited to, tape drives, optical drives, printers, disk controllers, other bus adapters, PCI adapters, PCIe adapters, NVLink adapters, workstations using one or more protocols including, but not limited to, Token Ring, Gigabyte Ethernet, Ethernet, Fibre Channel, SSA, Fiber Channel Arbitrated Loop (FCAL), Serial SCSI, Ultra3 SCSI, Infiniband, FDDI, ATM, 1394, ESCON, wireless relays, Twinax, LAN connections, WAN connections, high performance graphics, etc.

Though shown as distinct entities, the multiple I/O interface units 111, 112, 113, and 114 or the functionality of the I/O interface units 111, 112, 113, and 114 may be integrated into the same device, adapter, etc.

In various embodiments, the computer 100 is a multi-user mainframe computer, a single-user system, a server computer, storage system, or similar device that has little or no direct user interface, but receives requests from other computers (clients). In other embodiments, the computer 100 is implemented as a desktop computer, portable computer, laptop or notebook computer, tablet computer, pocket computer, telephone, smart phone, pager, automobile, teleconferencing system, appliance, or any other appropriate type of electronic device.

The network 130 may be any suitable network or combination of networks and may support any appropriate protocol suitable for communication of data and/or code to/from the computer 100 and at least the computer 180. In various embodiments, the network 130 may represent a data handling device or a combination of data handling devices, either connected directly or indirectly to the computer 100. In another embodiment, the network 130 may support wireless communications. In another embodiment, the network 130 may support hard-wired communications, such as a telephone line or cable. In another embodiment, the network 130 may be the Internet and may support IP (Internet Protocol). In another embodiment, the network 130 is implemented as a local area network (LAN) or a wide area network (WAN). In another embodiment, the network 130 is implemented as a hotspot service provider network. In another embodiment, the network 130 is implemented an intranet. In another embodiment, the network 130 is implemented as any appropriate cellular data network, cell-based radio network technology, or wireless network. In another embodiment, the network 130 is implemented as any suitable network or combination of networks. Although one network 130 is shown, in other embodiments any number of networks (of the same or different types) may be present.

FIG. 1 is intended to depict the representative major components of the computer 100. The individual components may have greater complexity than represented in FIG. 1, components other than or in addition to those shown in FIG. 1 may be present, and the number, type, and configuration of such components may vary. Several particular examples of such additional complexity or additional variations are disclosed herein; these are by way of example only and are not necessarily the only such variations. The various program instructions implementing e.g. upon computer 100 according to various embodiments of the invention may be implemented in a number of manners, including using various computer applications, routines, components, programs, objects, modules, data structures, etc.

Figure 2:
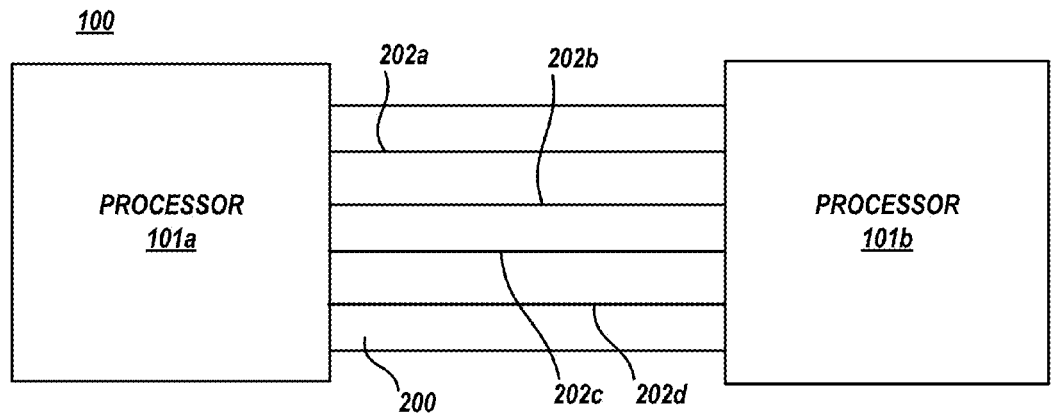
FIG. 2 illustrates a block diagram of an exemplary computer including a transmitting processor and a receiving processor connected by a processor bus, for implementing various embodiments of the invention.
Figure 3A:
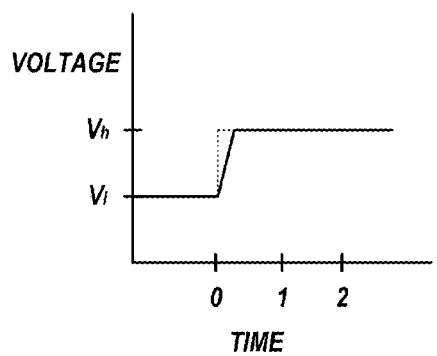
FIG. 3A-FIG. 3D illustrates a block diagram of an exemplary signal patterns used to determine distortion of a lane of the processor bus, according to embodiments of the present invention.
Figure 3B:
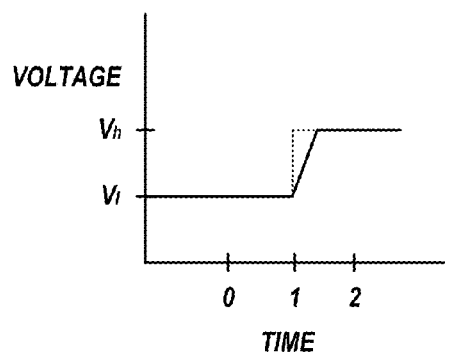
Figure 3C:
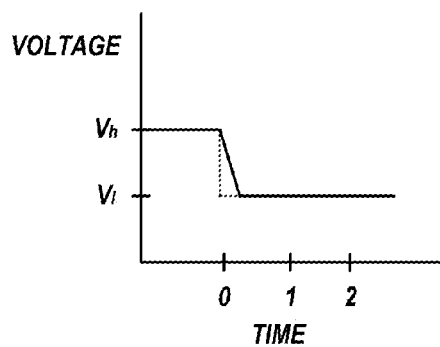
Figure 3D:
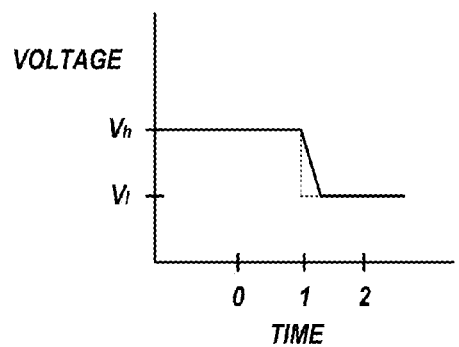

FIG. 2 illustrates a block diagram of computer 100 including a transmitting processor 101a (transmitter 101a) and a receiving processor 101b (receiver 101b) connected by a processor bus 200. Processor bus 200 provides a direct communication path between the transmitter 101a and the receiver 101b. Processor bus 200 includes a plurality of lanes 202, such as lane 202a, 202b, 202c, and 202d. Generally, transmitter 101a and receiver 101b are particular instances of the one or more processors 101 as described above.

Each lane 202 may include a single conductive wire that carries a high voltage (Vh) or a low voltage (Vl) that represents the signal. In this single-ended signaling implementation, the receiver 101b generally responds to the electrical difference between the received signal and a ground signal. Alternatively, each lane 202 may include two conductive wires. The technique sends the same electrical signal as a differential pair. In this differential signaling implementation, the receiving circuit responds to the electrical difference between the two signals, rather than the difference between the single conductive wire and ground as in the single-ended signaling implementation.

Figure 8:
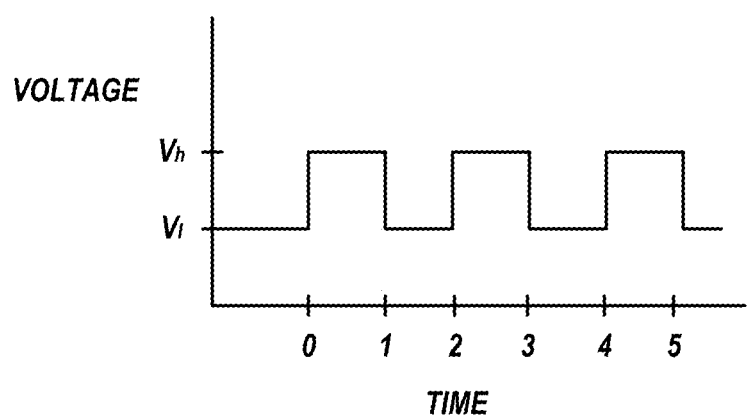
FIG. 8 illustrates an exemplary clock signal sent upon a dynamically assigned clock lane in the processor bus in subsequent data passing operations from a transmitting processor to a receiving processor, according to various embodiments of the present invention.

Generally, one of the lanes 202 that connect the transmitter 101a and the receiver 101b transfers a clock signal from the transmitter 101a to the receiver 101b. The clock signal, also referred to as a reference clock signal, is a particular type of signal that oscillates between Vh and Vl and is utilized like a metronome to coordinate actions of digital circuits within one or more components of computer 100. For example, the clock signal coordinate actions of a particular circuit within transmitter 101a and another circuit within receiver 101b. For clarity, the number of particular circuits referencing the clock signal may be exceeding large. The clock signal may be produced by or within a clock generator within the transmitter 101a. An exemplary clock signal is depicted in FIG. 8.

In an exemplary implementation, the processor bus 200 may operate as a thirty two bit differential signaling bus. Traditionally, this would mean that the bus include thirty two wires for communicating data signals. In some of the embodiments as disclosed herein, the processor bus 200 may include additional wires than would be necessary to operate at a predetermined width. To continue the thirty two bit differential signaling bus example, therefore, the processor bus 200 may include a total of thirty five data lanes 202. Thirty two of the data lanes 202 communicate data signals from transmitter 101a to receiver 101b, one of the data lanes 202 communicate the clock signal from transmitter 101a to receiver 101b, and two of the data lanes 202 are inactive. In this example, it is evident that two additional data lanes 202 are routed between the transmitter 101a and receiver 101b than are necessary to operate at the predetermined thirty two bit data width. The processor bus 200 may also be implemented as an eight bit bus, 16 bit bus, 64 bit bus, etc. and one or more additional lanes 202 may be included therein.

In another exemplary implementation, the processor bus 200 again operates as a thirty two bit differential signaling bus and therefore the predetermined data width is thirty two bits. In this implementation the processor bus 200 includes parity and error correcting code (ECC) functionality. There may be, for example, forty four lanes 202 within the processor bus 200. Thirty two of the forty four lanes 202 communicate data signals from transmitter 101a to receiver 101b to satisfy the predetermined data width. Eight of the forty four lanes 202 are additional lanes. The eight additional lanes may be inactive or may be active. If active, the additional lanes may transfer signals associated with e.g., parity, error correcting code (ECC), or other functions from transmitter 101a to receiver 101b. Finally, four of the forty four lanes 202 communicate respective clock signals from transmitter 101a to receiver 101b.

In embodiments that include the additional lanes 202, SI of each lane 202 may be determined and the lanes 202 that have the highest distortion may be assigned as inactive. As a result of lane 202 being assigned as inactive, the inactive lane 202 does not communicate any data signals from transmitter 101a to receiver 101b that makeup the predetermined data width. For example, if the data width of processor bus 200 is thirty two bits, the inactive lane does not transmit data signals that make up the thirty two bits. In a particular embodiment, the inactive lane 202 does not communicate any signals from transmitter 101a to receiver 101b subsequent to being assigned as inactive.

Also in embodiments that include the additional lanes 202, after operations of computer 100, if the SI of one of the lanes 202 within processor bus 200 degrades, the various embodiments disclosed herein may be utilized to dynamically move the clock lane to optimize the computer 100 performance accounting for the problem or failure that gave rise to the SI degradation of one of the lanes 202. For example, the degraded data lane 202 may be identified as having maximum distortion of all the data lanes 202 and may be set as inactive, reassigned from being the clock lane to no longer being the clock lane, etc. If the degraded lane is not set as inactive and is not the clock lane, the degraded lane is set as a lane 202 that transmits data signals that make up the data width of bus 200.

Processor bus 200 may connect transmitter 101*a* to receiver 101*b* while a particular one of the transmitter 101*a* or the receiver 101*b* being also connected to memory bus 103. In other implementations processor bus 200 may itself be connected to memory bus 103, as shown in FIG. 1, and connects both transmitter 101*a* and receiver 101*b* to memory 102. Further, in other implementations the processor bus 200 may be connected to I/O bus interface 105, as shown in FIG. 1, to connect transmitter 101*a* and receiver 101*b* to I/O bus 104.

In embodiments, the SI of each lane 202 is determined prior to transmitting data signals from transmitter 101*a* to receiver 101*b* associated with the execution of an application 160 by the transmitter 101*a* and/or receiver 101*b*. For example, the SI of each lane 202 is determined at transmitter 101*a* and receiver 101*b* boot-up prior to the execution of operating system 150 upon the transmitter 101*a* and/or receiver 101*b*.

To determine the SI of each lane, the transmitter 101*a* may sends signal patterns on each lane 202 of the processor bus 200. The receiver 101*b* superimposes the received signal patterns to form an eye pattern and distortion is determined by the receiver 101*b* measuring the width of the eye in the eye pattern associated with each lane 202. The transmitter 101*a* assigns the lane 202 associated with the minimum distortion as the lane 202 that transmits the clock signal from the transmitter 101*a* to the receiver 101*b* in subsequent data passing operations from the transmitter to the receiver. For example, when transmitter 101*a* and/or receiver 101*b* is executing program instructions of application 160 during normal operation of the computer 100, the transmitter 101*a* transmits the clock signal upon the predetermined lane 202 to the receiver 101*b*.

In other embodiments, a first lane 202*a* is assigned to communicate the clock signal from transmitter 101*a* to receiver 101*b*. The transmitter sends signal patterns on each of the other lanes 202*b*, 202*c*, and 202*d* of the processor bus 200. The signal patterns are delayed by a delay step and received by the receiver 101*b* and the distortion is determined for each of the other lanes 202*b*, 202*c*, and 202*d*. Signal patterns are again sent and are delayed by an incremented delay step upon each of the other lanes 202*b*, 202*c*, and 202*d* and distortion is again determined. This process is repeated until a predetermined maximum delay steps have been reached. In turn, lane 202*b* is assigned to communicate the clock signal from transmitter 101*a* to receiver 101*b*. The patterns are iteratively sent with each iteration adding a delay step upon the other lanes 202*a*, 202*c*, and 202*d*. This processes of sending the pattern upon all the other lanes not assigned as the clock lane with increased delay at each iteration is repeated until all lanes 202*a*, 202*b*, 202*c*, and 202*d* of the processor bus 200 have communicated the clock signal from transmitter 101*a* to receiver 101*b*.

It may then be determined which lane 202 was assigned as the clock lane that resulted in the lowest distortion at the lowest possible delay step. For example, it may be determined that two different lanes 202 had the exact same distortion with the distortion associated with a first lane 202 occurring at an lower delay step compared to the distortion associated with a second lane 202. Because the distortion associated with the first lane 202 is the minimum distortion that occurs at the lowest possible delay step, the lane 202 that was assigned as the clock resulting in the first lane 202 having the minimum distortion is assigned to communicate the clock signal from transmitter 101*a* to receiver 101*b* during normal operations of the computer 100, in association with the transmitter 101*a* and/or receiver 101*b* executing program instructions of application 160, etc.

An example of such an instance where two distortions are the same follows. It is determined that lane 202*d* had the minimum distortion when lane 202*c* was assigned as the clock and when the pattern was delayed by delay step 2. It is further determined that lane 202*b* had the same distortion when lane 202*a* was assigned as the clock and when the pattern was delayed by delay step 4. Because of the lower delay associated with delay step 2, lane 202*c* is assigned as the clock to communicate the clock signal from transmitter 101*a* to receiver 101*b* during normal operations of the computer 100, in association with the transmitter 101*a* and/or receiver 101*b* executing program instructions of application 160, etc.

Further, if processor bus 200 includes additional lane(s) 202, the lane(s) 202 that are associated with the highest distortion at the same delay step are set inactive in subsequent data passing operations. For example, as per above, lane 202*d* had the minimum distortion which occurred at delay step 2 when lane 202*c* was assigned as the clock. It may be determined that lane 202(*a*) had the highest distortion at delay step 2. Therefore, lane 202(*a*) may be assigned as inactive and as a result the inactive lane 202(*a*) does not communicate any data signals from transmitter 101*a* to receiver 101*b* that make up the data width of processor bus 200. For example, the inactive lane 202*a* does not communicate any signals from transmitter 101*a* to receiver 101*b* subsequent to being assigned as inactive.

In a particular example, there may be forty eight delay steps and four lanes 202*a*, 202*b*, 202*c*, and 202*d* within processor bus 200. Lane 202*a* is assigned as the clock and the pattern is passed upon the lanes 202*b*, 202*c*, and 202*d* forty eight times, each successive pattern passing iteration adding a predetermined amount of delay. By adding delay, receiver 101*b* delays the time receiver 101*b* looks for the received signal, or in other words increases the window in which receiver 101*b* samples for the received signal. Lane 202*b* is then assigned as the clock and the pattern is passed upon the lanes 202*a*, 202*c*, and 202*d* forty eight times, each successive pattern passing iteration adding the predetermined amount of delay. Lane 202*c* is then assigned as the clock and the pattern is passed upon the lanes 202*a*, 202*b*, and 202*d* forty eight times, each successive pattern passing iteration adding the predetermined amount of delay. Finally, lane 202*d* is then assigned as the clock and the pattern is passed upon the lanes 202*a*, 202*b*, and 202*c* forty eight times, each successive pattern passing iteration adding the predetermined amount of delay. Thus, in the present example, there is forty eight times four, or one hundred ninety two, instances of finding the clock lane, lane 202, and lowest delay step combination that results in the minimum distortion.

FIG. 3A-FIG. 3D illustrates a block diagram of an exemplary signal patterns used to determine the distortion of a lane of the processor bus, according to embodiments of the present invention.

The pattern sent by the transmitter 101*a* to the receiver 101*b* is any pattern from which an eye diagram may be generated at the receiver 101*b*. The receiver 101*b* generates the eye diagram by overlaying sweeps of different segments of the pattern driven by the clock signal transmitted upon the clock lane 202. The clock signal triggering edge may be positive or negative, but the received signal that appears after a delay period may go either way; there is no way of knowing beforehand the value of an arbitrary bit. The eye diagram may be generated by the receiver 101b overlaying or superimposing the plurality of received patterns on each other. Theoretically, eye diagrams should like rectangular boxes. In reality, SI is imperfect, so the patterns do not line perfectly on top of each other, and an eye-shaped pattern results. Differences in timing of the receipt of the pattern signs and amplitude from Vh to Vl cause the eye opening to shrink.

The patterns sent upon each lane 202 may contain every possible bit sequence from simple alternate 1's (i.e. Vh) and 0's (i.e. Vl) to isolated 1's after long runs of 0's, etc. In FIG. 3A-FIG. 3D, exemplary bit sequence patterns 011, 001, 100, and 110 are sent by the transmitter 101a, as shown by the dotted pattern, and are received by the receiver 101b, as is shown in the solid pattern. As is depicted, the received pattern appears after a delay period. The received pattern may be superimposed over one another at the receiver 101b to obtain the eye diagram.

Figure 4:
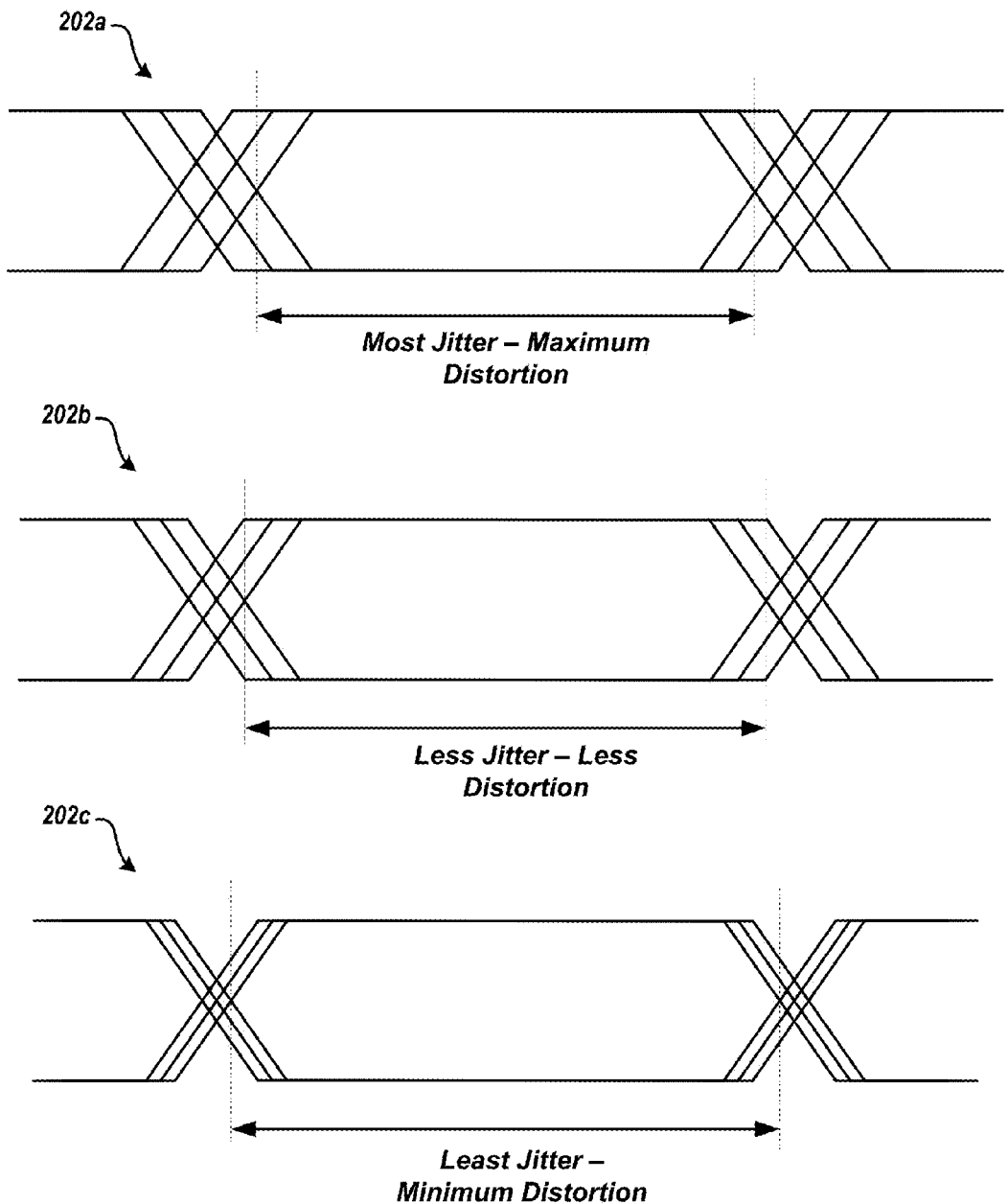
FIG. 4 illustrates signal patterns overlaid upon each other to determine distortion of a lane of the processor bus, according to embodiments of the present invention.

FIG. 4 illustrates received patterns signals superimposed over one another at the receiver 101b to determine the distortion of the associated lane, according to embodiments of the present invention. The finite rise and fall times of signals cause eye diagrams to actually look as those depicted in FIG. 4. When high speed digital signals are transmitted, the impairments introduced at various stages lead to timing errors. One such timing error is "jitter," which results from the misalignment of rise and fall times of the received signal compared to the sent signal. Jitter occurs when a rising or falling edge occurs at times that differ from the ideal time relative to the clock signal. Some edges occur early, some occur late.

Because of PCB physical layout constraints, some of lanes 202 that electrically may not have similar lengths and/or may not have similar cross-sectional areas. These variations may result in the signal margin associated with each lane 202 being different. Such difference may be determined from the eye diagram generated by the receiver 101b from the received pattern from transmitter 101a. Upon the receipt of the pattern transmitted from transmitter 101a upon lane 202a, receiver 101b forms an associated eye diagram, exemplary depicted at the top of FIG. 4. The receiver determines the width of the eye in the eye diagram to determine the distortion associated with lane 202a. Likewise, upon the receipt of the pattern transmitted from transmitter 101a upon lanes 202b and 202c, receiver 101b forms respective eye diagrams. The receiver measures the width of the eye in each of the eye diagrams to determine the distortions associated with lanes 202a, 202b, and 202c, respectively. Because the eye diagram indicates that pattern transmitted upon lane 202a includes the most jitter, the width of the eye in the associated eye diagram is the smallest. Likewise, because the eye diagram indicates that pattern transmitted upon lane 202c includes the least jitter, the width of the eye in the associated eye diagram is the largest. As such, lane 202a is determined to have the maximum distortion, lane 202b is determined to have a smaller distortion relative to that of lane 202a, and lane 202c is determined to have the minimum distortion.

Though three exemplary eye diagrams are depicted as being generated by receiver 101b in FIG. 4, respective eye diagrams are generated by the receiver 101b for each lane 202 from the pattern sent from transmitter 101a thereupon, as is consistent with the description above.

Figure 5:
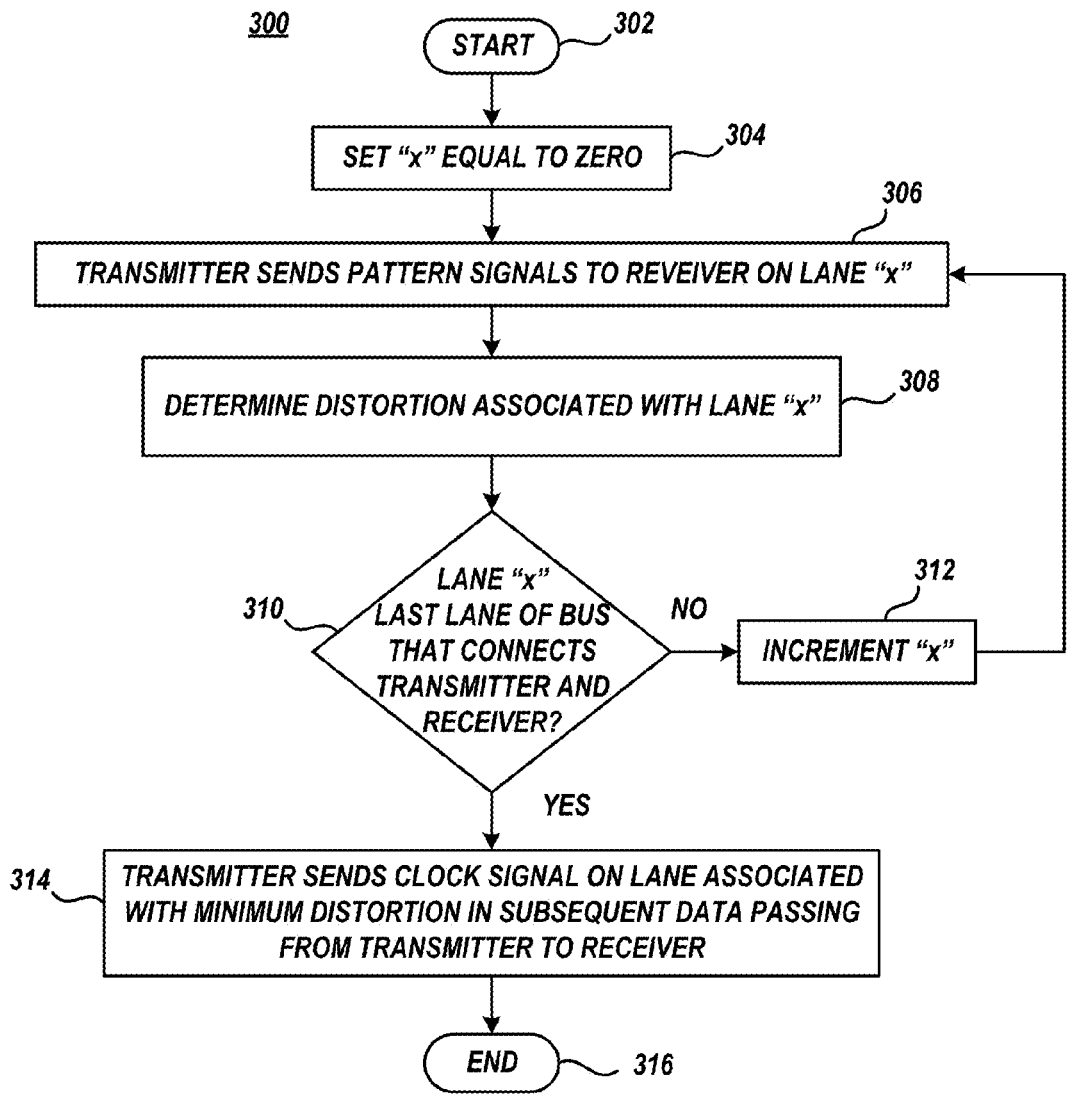
FIG. 5 illustrates an exemplary method of dynamically assigning a clock lane in the processor bus to increase computer performance and security, according to various embodiments of the present invention.

FIG. 5 illustrates an exemplary method 300 of dynamically assigning a clock lane in the processor bus 200 to increase computer performance and security, according to various embodiments of the present invention. Method 300 may be utilized, for example, by the combination of the transmitter 101a and receiver 101b.

Method 300 begins at block 302 and continues by setting variable "x" equal to zero (block 304). Variable "x" generally counts or tracks the iterations of passing signal patterns on each lane 202 within processor bus 200, such that each lane 202 may transmit the signal pattern from transmitter 101a to receiver 101b. In an embodiment, transmitter 101a or receiver 101b may set a first local "x" counter to zero.

Method 300 may continue by transmitter 101a sending signal patterns that are received by receiver 101b on lane "x" (block 306). For example, at iteration "0," the signal pattern(s) are sent by transmitter 101a and are received by receiver 101b on lane 0, at iteration "1," the signal pattern(s) are sent by transmitter 101a and are received by receiver 101b on lane 1, etc.

Method 300 may continue by receiver 101b determining distortion associated with lane "x" (block 308). For example, receiver 101b determines the distortion by assembling the received pattern to form an eye diagram associated with lane "x" and measuring the width of the eye. At iteration "0," the signal pattern(s) received by receiver 101b on lane 0 may be assembled as an eye diagram and the width of the eye measured, at iteration "1," the signal pattern(s) received by receiver 101b on lane 1 may be assembled as an eye diagram and the width of the eye measured, etc.

Method 300 may continue by determining whether lane "x" is the last lane 202 of processor bus 200 that communicatively connects the transmitter 101a and receiver 101b (block 310). For example, either transmitter 101a or receiver 101b may determine if signal patterns have been sent upon each of the lanes 202 in the processor bus 200. If lane "x" is not the last lane 202 of processor bus 200, the variable "x" is incremented (block 312). For example, transmitter 101a or receiver 101b may increment the first local counter.

If lane "x" is the last lane 202 of processor bus 200, signal patterns have been sent upon each of the lanes 202 in the processor bus 200 and the distortion associated with each lane 202 may be determined. At this point, the receiver 101b may determine the lane 202 associated with the minimum distortion and identify that lane 202 to transmitter 101a by sending a predetermined signal upon the identified lane 202 that is received by transmitter 101a.

Method 300 may continue by the transmitter 101a sending the clock signal on the lane 202 associated with the minimum distortion in subsequent data passing operations from transmitter 101a to receiver 101b (block 314). For example, the identified lane 202 is utilized to send the clock signal during normal operations of the computer 100, in association with the transmitter 101a and/or receiver 101b executing program instructions of operating system 160, in association with the transmitter 101a and/or receiver 101b executing program instructions of application 160, etc. Method 300 ends at block 316.

Method 300 generally enhances computer 100 performance by dynamically assigning the lane 202 having the best SI properties as the reference clock to be utilized by computer 100 components to coordinate operations. Method 300 further increases computer 100 security by dynamically assigning any of the particular lanes of the processor bus as the clock lane. Therefore, when computer 100 is booted at distinct instances, the lane assigned as the reference clock may be different. This dynamic assignment adds complexity, to better protect the operational details of the computer 100. For example, a changing clock lane at every boot adds to the complexity of the unauthorized user determining the operational logic of the processor.

Figure 6:
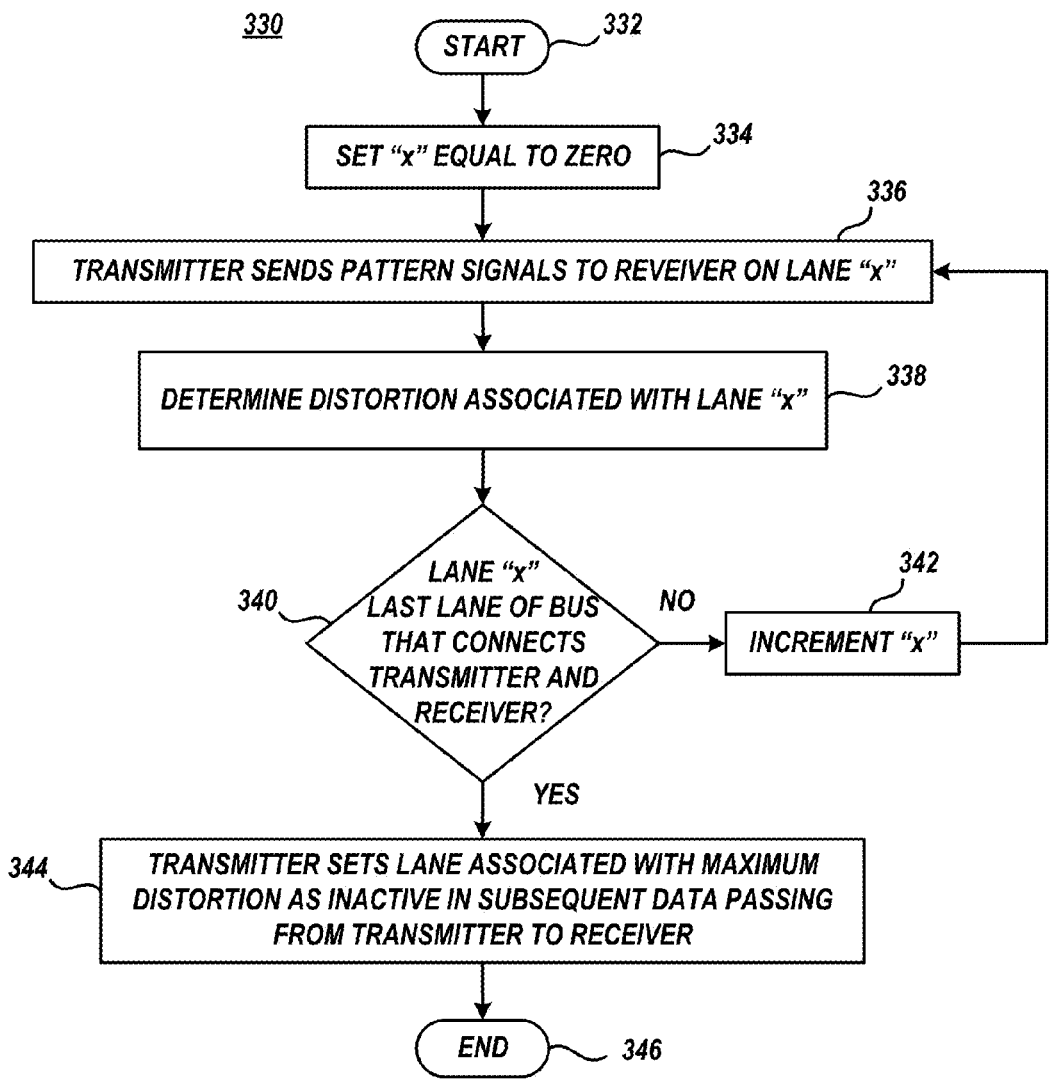
FIG. 6 illustrates an exemplary method of dynamically deactivating a lane in the processor bus to increase computer performance and security, according to various embodiments of the present invention.

FIG. 6 illustrates an exemplary method 330 of dynamically deactivating a lane in the processor bus 200 to increase computer performance and security, according to various embodiments of the present invention. Method 330 may be utilized, for example, by the combination of the transmitter 101a and receiver 101b when additional lanes 202 are included within processor bus 200. Method 330 may be utilized in combination with method 300 to determine the lanes 202 of the processor bus 200 that have the highest and lowest distortion. The lane that has the minimum distortion may be assigned as the clock lane as is described in method 300 and the lane that has the maximum distortion may be assigned as inactive.

Method 330 begins at block 332 and continues by setting variable "x" equal to zero (block 334) and may continue by transmitter 101a sending signal patterns that are received by receiver 101b on lane "x" (block 336). Method 330 may continue by receiver 101b determining distortion associated with lane "x" (block 338).

Method 330 may continue by determining whether lane "x" is the last lane 202 of processor bus 200 that communicatively connects the transmitter 101a and receiver 101b (block 340). If lane "x" is the last lane 202 of processor bus 200, signal patterns have been sent upon each of the lanes 202 in the processor bus 200 and the distortion associated with each lane 202 may be determined. At this point, the receiver 101b may determine the lane 202 associated with the maximum distortion and identify that lane 202 to transmitter 101a by sending a predetermined signal upon the identified lane 202 that is received by transmitter 101a.

Method 330 may continue by the transmitter 101a setting the lane 202 associated with the maximum distortion as inactive in subsequent data passing operations from transmitter 101a to receiver 101b (block 314). For example, the identified lane 202 does not transmit data signals that make up the data width of processor bus 200. In another example, the identified lane 202 is blocked from transmitting signals during normal operations of the computer 100, in association with the transmitter 101a and/or receiver 101b executing program instructions of operating system 160, in association with the transmitter 101a and/or receiver 101b executing program instructions of application 160, etc. Method 330 ends at block 346.

Method 330 generally enhances computer 100 performance by dynamically deactivating the lane 202 having the lowest SI properties so as to not be utilized in subsequent computer 100 operations. Therefore, when computer 100 is booted at distinct instances, the inactive lane in the processor bus may be different. This dynamic deactivation adds complexity, to better protect the operational details of the computer 100. For example, a changing inactive lane at every boot adds to the complexity of the unauthorized user determining the operational logic of the processor.

Figure 7:
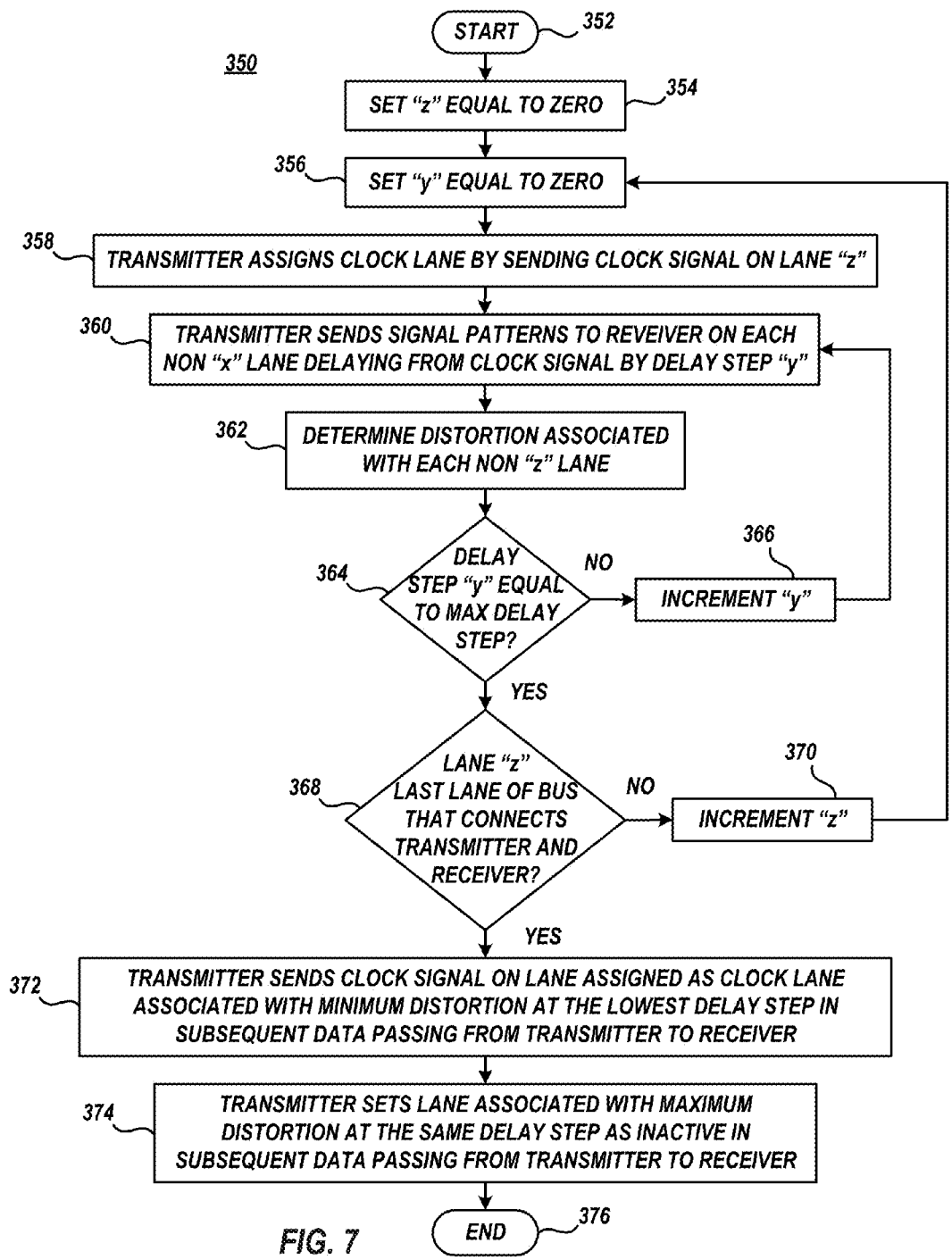
FIG. 7 illustrates an exemplary method of assigning a clock lane and/or dynamically deactivating a lane in the processor bus to increase computer performance and security, according to various embodiments of the present invention.

FIG. 7 illustrates an exemplary method 350 of assigning a clock lane and/or dynamically deactivating a lane in the processor bus 200 to increase computer 100 performance and security, according to various embodiments of the present invention. Method 330 may be utilized, for example, by the combination of the transmitter 101a and receiver 101b when additional lanes 202 are included within processor bus 200.

Method 350 begins at block 352 and continues by setting variable "z" equal to zero (block 354). Variable "z" generally counts or tracks the iterations of assigning a particular lane 202 within processor bus 200 as the clock lane, such that each lane 202 is assigned as the clock lane that transmits the clock signal from transmitter 101a to receiver 101b. In an embodiment, transmitter 101a or receiver 101b may set a second local "z" counter to zero.

Method 350 may continue by setting variable "y" equal to zero (block 356). Variable "z" generally counts or tracks the iterations of delay steps, to iteratively increase the time receiver 101b looks for the received signal, or in other words increases the window in which receiver 101b samples for the received signal relative to received clock signal. In an embodiment, transmitter 101a or receiver 101b may set a third local "y" counter to zero.

Method 350 may continue by the transmitter 101a assigning the clock lane by setting or sending the clock signal to receiver 101b upon lane "z" (block 358). For example, at clock assignment iteration "0," the clock signal is sent by transmitter 101a and is received by receiver 101b on lane 0, at clock assignment iteration "1," the clock signal is sent by transmitter 101a and are received by receiver 101b on lane 1, etc.

Method 350 may continue by the transmitter 101a sending signal patterns that are received by receiver 101b on each non "z" lane 202 within the processor bus 200 delaying pattern by delay step "y" (block 360). For example, at clock assignment iteration "0," signal patterns are iteratively sent on the other lanes 202 within bus 200 (i.e. every lane but for lane "0"). The first delay step iteration no delay is added. Therefore, at the first delay step iteration no increase in time exists for the time receiver 101b to look for the received signal. At the second delay step iteration, a predetermined amount of delay is added and so that receiver 101b looks for the received signal for a longer time than is dictated by the clock signal. At the third delay step iteration, the predetermined amount of delay is again added and so that receiver 101b looks for the received signal for an even longer time than is dictated by the clock signal.

Method 350 may continue with the receiver determining the distortion associated with each non "z" lane 202 (block 362). For example, receiver 101b determines the distortion by assembling the received pattern to form an eye diagram associated with lane "z" and measuring the width of the eye. The distortion for each non clock lane is determined at each delay step iteration. Thus, if there are 48 delay steps, the distortion for each non clock lane is determined 48 instances.

Method 350 may continue by determining if the delay step "y" is equal to a predetermined max delay step (block 364). For example, the transmitter 101a or the receiver 101b may determine if the third local "y" counter equals the number of maximum delay steps. Thus, if the variable "y" is less than the predetermined number of delay steps, the delay step is incremented (block 366) and another pattern is sent by the transmitter 101a and received by the receiver 101b with an increased delay by returning to block 360. If the predetermined number of delay steps equals the variable "y", method continues to block 368 where it is determined if lane "z" is the last lane 202 in processor bus 200 (block 368). If lane "z" is not the last lane 202 in processor bus 200, the variable "z" is incremented (block 370) and the variable "y" is reset to zero, by returning to block 356.

Method 350 may continue if lane "z" is the last lane 202 in processor bus 200, by the transmitter 101a sending the clock signal on the lane 202 that was assigned as the clock lane that is associated with the minimum distortion at the lowest delay step in subsequent data passing operations from transmitter 101*a* to receiver 101*b* (block 372). In other words, in all the iterations of each lane being assigned as the clock lane and all the iterations of adding delay the minimum distortion, or the widest eye, is found. If there are two or more eyes that have the same width, which indicates the lanes have an equal distortion, the "tie-breaker" is the delay step, in that the lowest delay step is preferable. For example, it may be determined that two different lanes 202 had the exact same distortion with the distortion associated with a first lane 202 occurring at an lower delay step compared to the distortion associated with a second lane 202. In this example, it would be determined that the second lane has the minimum distortion since it occurred at a lower delay step. It is then determined which of the lanes 202 within the processor bus was assigned as the clock lane at the instance of the minimum distortion. This assigned clock lane is then assigned as the clock lane in subsequent computer 100 operations.

In embodiments where additional lanes 202 exist within processor bus 200 than are necessary to satisfy the data width of the processor bus 200, it is determined which lane 202 had the highest distortion at the same delay step (block 374). This highest lane is then deactivated for subsequent computer 100 operations such that no data signals are passed from transmitter 101*a* to receiver 101*b* that makeup the data width of the processor bus 200. If there are multiple additional lanes, an equal number of lanes having the highest distortions may be set as inactive.

Method 350 generally enhances computer 100 performance by dynamically assigning the same lane that was assigned as the clock lane that gave rise to maximized SI of the other lanes 202 within the processor bus 200 as the reference clock utilized by computer 100 components to coordinate operations. Method 350 further increases computer 100 security by dynamically assigning any of the particular lanes of the processor bus as the reference clock. Therefore, when computer 100 is booted at distinct instances, the lane assigned as the reference clock may be different. This dynamic assignment adds complexity, to better protect the operational details of the computer 100. For example, a changing clock lane at every boot adds to the complexity of the unauthorized user determining the operational logic of the processor.

FIG. 8 illustrates an exemplary clock signal sent upon a dynamically assigned clock lane in the processor bus 200 in subsequent data passing operations from a transmitting processor to a receiving processor, according to various embodiments of the present invention. For example, during subsequent operation of computer 100, the dynamically assigned clock lane transmits the clock signal. Subsequent operations of computer 100 may be data passing operations associated with the transmitter 101*a* and/or receiver 101*b* executing program instructions of operating system 160, data passing operations associated with the transmitter 101*a* and/or receiver 101*b* executing program instructions of application 160, etc. The transmitted clock signal is used to coordinate actions of a first digital circuit within the transmitter 101*a* and a second digital circuit within the receiver 101*b*.

Embodiments of the present invention may be a system, a method, and/or a computer program product. The computer program product may include a computer readable storage medium (or media) having computer readable program instructions thereon for causing a processor to carry out aspects of the present invention. The computer readable storage medium is a tangible device that can retain and store instructions for use by an instruction execution device. The computer readable storage medium may be, for example, but is not limited to, an electronic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate exemplary architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over those found in the marketplace, or to enable others of ordinary skill in the art to understand the embodiments disclosed herein.

What is claimed is:

1. A data handling system comprising:
    a transmitter that transmits a signal pattern upon each lane of a multiple lane bus;
    a receiver that receives the signal pattern from each lane of the multiple lane bus, determines a distortion associated with the received signal pattern from each lane, and identifies a particular lane of the multiple lane bus that is associated with a smallest distortion;
    wherein the transmitter or the receiver assigns the particular lane associated with smallest distortion as a clock lane that transmits a reference clock signal between the transmitter and the receiver in subsequent signal transmissions between the transmitter and the receiver.

2. The data handling system of claim 1, wherein the reference clock signal coordinates actions of a first digital circuit within the transmitter and a second digital circuit within the receiver.

3. The data handling system of claim 1, wherein the receiver further generates a respective eye diagram of the received signal pattern from each lane.

4. The data handling system of claim 3, wherein the receiver further measures a respective eye width of each eye diagram of the received signal pattern from each lane.

5. The data handling system of claim 4, wherein the receiver identifies the particular lane associated with the smallest distortion as the lane associated with the widest eye width.

6. The data handling system of claim 4, further comprising an additional lane than is necessary for the multiple lane bus to communicate a predetermined data width from the transmitter to the receiver.

7. The data handling system of claim 6, wherein the receiver identifies a lane of the multiple lane bus associated with the narrowest eye width as an inactive lane that does not transmit signals from the transmitter to the receiver in subsequent signal communications from the transmitter to the receiver.

8. A data handling system comprising:
    a transmitting processor that transmits a signal pattern upon each lane of a multiple lane bus;
    a receiving processor that receives the signal pattern from each lane of the multiple lane bus, determines a distortion associated with the received signal pattern from each lane, and identifies a particular lane of the multiple lane bus that is associated with a smallest distortion;
    wherein the transmitting processor or the receiving processor assigns the particular lane associated with smallest distortion as a clock lane that transmits a reference clock signal between the transmitting processor and the receiving processor in subsequent signal transmissions between the transmitting processor and the receiving processor.

9. The data handling system of claim 8, wherein the reference clock signal coordinates actions of a first digital circuit within the transmitting processor and a second digital circuit within the receiving processor.

10. The data handling system of claim 8, wherein the receiving processor further generates a respective eye diagram of the received signal pattern from each lane.

11. The data handling system of claim 10, wherein the receiving processor further measures a respective eye width of each eye diagram of the received signal pattern from each lane.

12. The data handling system of claim 11, wherein the receiving processor identifies the particular lane associated with the smallest distortion as the lane associated with the widest eye width.

13. The data handling system of claim 11, further comprising an additional lane than is necessary for the multiple lane bus to communicate a predetermined data width from the transmitting processor to the receiving processor.

14. The data handling system of claim 13, wherein the receiving processor identifies a lane of the multiple lane bus associated with the narrowest eye width as an inactive lane that does not transmit signals from the transmitting processor to the receiving processor in subsequent signal communications from the transmitting processor to the receiving processor.

15. A system comprising a first processor communicatively connected to a second processor by a multiple lane bus, the first processor comprising a first computer readable storage medium and the second processor comprising a second computer readable storage medium, the first computer readable storage medium and the second computer readable storage medium collectively comprising program instructions that are readable to cause:

the first processor to transmit a signal pattern upon each lane of a multiple lane bus;

the second processor to receive the signal pattern from each lane of the multiple lane bus, determine a distortion associated with the received signal pattern from each lane, and identify a particular lane of the multiple lane bus that is associated with a smallest distortion; and the first processor or the second processor to assign the particular lane associated with smallest distortion as a clock lane that transmits a reference clock signal between the first processor and the second processor in subsequent signal transmissions between the first processor and the second processor.

16. The system of claim 15, wherein the reference clock signal coordinates actions of a first digital circuit within the first processor and a second digital circuit within the second processor.

17. The system of claim 15, wherein the second processor further generates a respective eye diagram of the received signal pattern from each lane.

18. The system of claim 17, wherein the second processor further measures a respective eye width of each eye diagram of the received signal pattern from each lane.

19. The system of claim 18, wherein the second processor identifies the particular lane associated with the smallest distortion as the lane associated with the widest eye width.

20. The system of claim 15, further comprising an additional lane than is necessary for the multiple lane bus to communicate a predetermined data width from the first processor to the second processor.

* * * * *